United States Patent
Deshpande et al.

(10) Patent No.: US 9,509,021 B2
(45) Date of Patent: Nov. 29, 2016

(54) ESTIMATION OF LITHIUM-ION BATTERY CAPACITY AS FUNCTION OF STATE-OF-LITHIATION SWING

(71) Applicant: FORD GLOBAL TECHNOLOGIES, LLC, Dearborn, MI (US)

(72) Inventors: Rutooj D. Deshpande, Detroit, MI (US); Dawn Bernardi, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/517,009

(22) Filed: Oct. 17, 2014

(65) Prior Publication Data

US 2016/0107590 A1     Apr. 21, 2016

(51) Int. Cl.
| | |
|---|---|
| *H01M 10/052* | (2010.01) |
| *H01M 10/48* | (2006.01) |
| *B60L 11/18* | (2006.01) |
| *H01M 4/36* | (2006.01) |
| *H01M 4/587* | (2010.01) |
| *H01M 10/0525* | (2010.01) |

(52) U.S. Cl.
CPC .......... *H01M 10/48* (2013.01); *B60L 11/1857* (2013.01); *H01M 4/366* (2013.01); *H01M 4/587* (2013.01); *H01M 10/0525* (2013.01); *H01M 2220/20* (2013.01)

(58) Field of Classification Search
CPC ......... H01M 10/0525; H01M 10/052; H01M 4/133
See application file for complete search history.

(56) References Cited

U.S. PATENT DOCUMENTS

| | | | |
|---|---|---|---|
| 6,630,813 B2 | 10/2003 | Berels et al. | |
| 2010/0285365 A1 | 11/2010 | Kozinsky et al. | |
| 2012/0045670 A1* | 2/2012 | Stefan | H01M 4/0421 429/61 |
| 2012/0100438 A1 | 4/2012 | Fasching et al. | |

OTHER PUBLICATIONS

Cannarella, J. and Arnold, C. (2014) State of health and charge measurements in lithium-ion batteries using mechanical stress. Journal of Power Sources, 269; 7-14.
Deshpande, R., Cheng, Y.-T., and M. W. Verbrugge. (2010). Modeling diffusion-induced stress in nanowire electrode structures. Journal of Power Sources, 2010. 195(15): p. 5081-5088.
Deshpande, R.D. (2011). Understanding and improving lithium ion batteries through mathematical modeling and experiment in theses and dissertations. Chemical and Materials Engineering. Paper 4,. 2011. University of Kentucky (Lexington).
Deshpande, R.D. et al. (2012) Battery cycle life prediction with coupled chemical degradation and fatigue mechanics. Journal of the Electrochemcial Society, 2012. 159(10): p. A1730-A1738.
Pinson, M.B. and Bazant, M.Z. (2013). Theory of SEI formation in rechargeable batteries: Capacity fade, accelerated agin and lifetime prediction. J. Electrochem. Soc. 2013, vol. 160. issue 2, p. A243-A250.

* cited by examiner

*Primary Examiner* — Stewart Fraser
*Assistant Examiner* — Olatunji Godo
(74) *Attorney, Agent, or Firm* — Carlson, Gaskey & Olds, P.C.

(57) ABSTRACT

A method includes controlling operation of a vehicle in response to an estimation of a capacity loss and capacity of a lithium-ion battery module of the vehicle. The estimation is a function that includes a state-of-lithiation swing and fracture of a solid-electrolyte interphase of an electrode of the lithium-ion battery module. The methodology can be implemented in a vehicle that includes a lithium-ion battery module and a controller that controls operation of the vehicle in response to such an estimation.

15 Claims, 7 Drawing Sheets

ESTIMATION OF LITHIUM-ION BATTERY CAPACITY AS A FUNCTION OF STATE-OF-LITHIATION SWING

BACKGROUND

A typical rechargeable lithium-ion battery includes a negative electrode and a positive electrode separated by an electrolyte. Lithium ions move from the negative electrode through the electrolyte to the positive electrode during discharging and from the positive electrode through the electrolyte to the negative electrode during charging.

Cyclic charging/discharging degrades the electrodes and, in turn, can reduce the capacity of the battery. The mechanical and/or electrochemical mechanisms of degradation are not well understood and, as a result, models that have been developed for the estimation of battery health are based primarily on short-term empirical testing that is particular to a specific battery system. Although useful in some aspects, short-term empirical testing may be inaccurate and insufficient for mathematically modeling slow electrochemical processes over much longer periods.

SUMMARY

A method according to an example of the present disclosure involves controlling operation of a vehicle in response to an estimation of a capacity loss and capacity of a lithium-ion battery module of the vehicle. The estimation of the capacity loss is a function that includes a state-of-lithiation swing and fracture of solid-electrolyte interphase of an electrode of the lithium-ion battery module.

In a further example of any of the examples herein, the capacity loss is proportional to the square of the state-of-lithiation swing.

In a further example of any of the examples herein, the capacity loss is proportional to the product of a constant and the square of the state-of-lithiation swing.

In a further example of any of the examples herein, the function also includes a ratio, in a given voltage range, of an initial negative electrode capacity of the lithium-ion battery module to a cell capacity of the lithium-ion battery module.

In a further example of any of the examples herein, the function also includes a number of charge-discharge cycles of the lithium-ion battery module.

In a further example of any of the examples herein, the capacity is represented by $Q_n$, and the function is:

$$Q_n = R_{AC} \times \left( \Delta SOL_0 - (n-1)a(\Delta SOL_0)^2 + (n-1)(n-2)a^2(\Delta SOL_0)^3 - \sum_{i=3}^{n}(i-2)(3i-8)a^3(\Delta SOL_0)^4 \right)$$

wherein,
$R_{AC}$ is an initial ratio of anode electrode capacity of the lithium-ion battery module to initial cell capacity in a given voltage range,
$\Delta SOL_0$ is an initial state of lithiation,
n is a number of charge-discharge cycles,
a is a constant of the lithium-ion battery module, and
i is a polynomial order derivative.

A further example of any of the examples herein further includes storing the capacity in a memory module of the vehicle in place of a prior capacity of the lithium-ion battery module.

In a further example of any of the examples herein, the electrode is a negative electrode of the lithium-ion battery module.

In a further example of any of the examples herein, the electrode includes a graphite core surrounded by a shell of the solid-electrolyte interphase.

In a further example of any of the examples herein, the methodology can be implemented in a vehicle that includes a lithium-ion battery module and a controller controlling operation of the vehicle in response to estimation of a capacity loss and capacity of the lithium-ion battery module as a function that includes a state-of-lithiation swing and fracture of solid-electrolyte interphase of an electrode of the lithium-ion battery module.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

One challenge in using lithium-ion batteries in vehicles is management of battery health. The electrodes of a lithium-ion battery degrade and cause capacity fade over time. Poor understanding of battery health in a vehicle can result in mismanagement of vehicle functions that are related to battery health.

Chemical degradation of the electrodes in lithium-ion batteries can occur from instability of the battery electrolyte and can cause reactions that irreversibly consume lithium. The reactions form a solid-electrolyte interphase ("SEI") on the electrodes. For example, in particulate graphite electrodes, the SEI forms as a shell around a graphite core. Although SEI formation reduces the amount of active lithium in the battery (and thus the capacity), a limited amount of SEI formation is desired to passivate further reactions with the electrolyte and stabilize the battery.

Diffusion of lithium in the electrodes upon charging and discharging can cause diffusion-induced stresses. Such stresses can cause mechanical degradation in the electrode material. The mechanism of diffusion-induced stresses at relatively high charging/discharging cycle rates in electrode materials, such as graphite, is one area of focus for modeling capacity fade and thus battery health. However, at lower cycle rates, fracture of the SEI can be a mechanism of capacity fade. As will be discussed in greater detail herein, lithiation swing in the SEI, and the resulting stresses in the SEI, can be used for the estimation of battery capacity loss and thus also for enhanced management of battery health in vehicles. Capacity loss can be used to estimate capacity.

Figure 1:
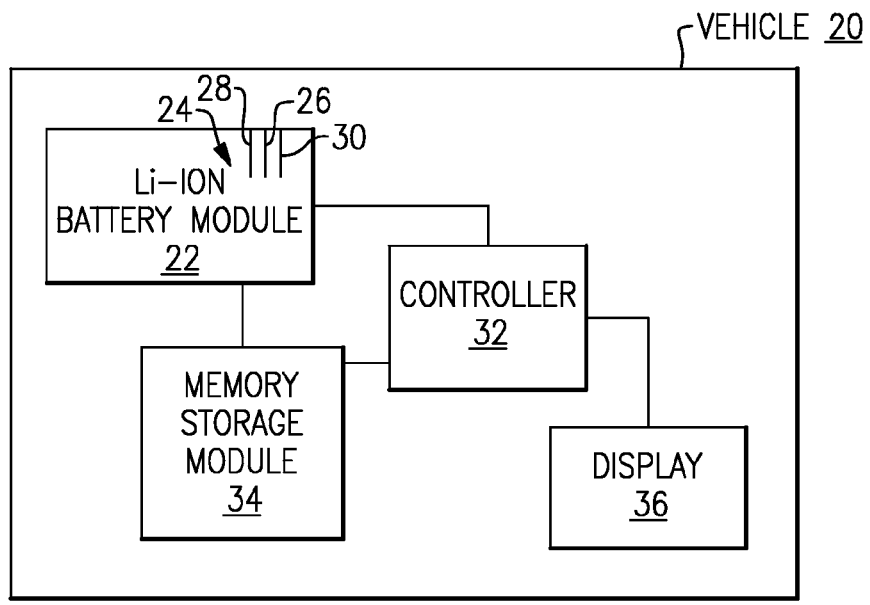
FIG. 1 schematically illustrates an example vehicle with a controller controlling operation of the vehicle in response to estimation of a battery capacity loss and capacity as a function that includes a state-of-lithiation swing and fracture of solid-electrolyte interphase.of an electrode of a lithium-ion battery module.

FIG. 1 schematically illustrates an example vehicle 20 that has a rechargeable lithium-ion battery module 22 (hereafter "battery 22"). The battery 22 includes at least one lithium-ion electrochemical cell 24, but more typically can include multiple lithium-ion electrochemical cells. The cell 24 generally includes an electrolyte 26 arranged between positive and negative electrodes 28/30. A controller 32 controls one or more operations in the vehicle 20 in response to the capacity loss and capacity of the battery 22. The capacity loss is a function of a state-of-lithiation swing on a solid-electrolyte interphase ("SEI") of an electrode in the battery 22.

The controller 32 may be in communication with the battery 22 to receive status information there from in connection with controlling the one or more operations in the vehicle 20 in response to the capacity or capacity loss of the battery 22. In the illustrated example, the controller 32 is also in communication with a memory storage module 34 and display 36. The controller 32 utilizes the memory storage module 36 for storing data, such as the estimated capacity or capacity loss of the battery 22, which may be in the form of a voltage or capacity profile. For example, upon estimation of the capacity loss, the controller can store the capacity loss in the memory storage module 36 in place of a prior capacity loss of the battery 22.

In response to the estimation of the capacity loss, the controller 32 can display information related to or based on the capacity or capacity loss. Such information may relate to the battery and can include, for example only, a health indication. Additionally or alternatively, the estimation of capacity can also be used in connection with the operational events of vehicle components that draw current from the battery 22, such that the controller 32 can maintain a current estimated remaining power based on the estimation of capacity after an event or events of known electrical consumption. Control schemes of the controller 32 can also include participation of the controller 32 in event decisions that are based on capacity or remaining power estimated from the capacity.

Figures 2, 3:
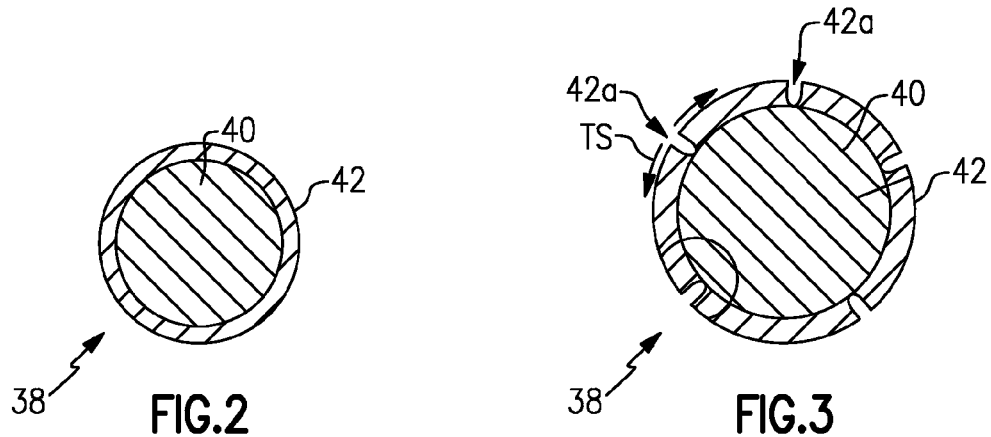
FIG. 2 illustrates an example electrode particle that has a graphite core and a solid-electrolyte interphase shell.
FIG. 3 illustrates the electrode particle of FIG. 2 in a lithiated state.

FIG. 2 illustrates a cross-section of representative electrode particle 38 of the negative electrode 30 of the cell 24. In this example, the electrode particle 38 includes a graphite core 40 surrounded by a shell 42 of SEI, formed as described above. Upon relatively slow charging of the battery 22, lithium diffuses in the SEI of the shell 34, causing lithiation-induced stresses.

As shown in FIG. 3, in a lithiated state, the electrode particle 38 expands and the shell 42 is under tensile stress (TS). With cyclic charging/discharging the tensile stresses can cause fracture of the shell 42, as represented by cracks 42a. The cracks 42a can expose fresh surface area of the underlying graphite core 40, which can then consume additional active (free) lithium by forming additional SEI, as represented at 42b in FIG. 4. The formation of additional SEI and consumption of lithium cause capacity fade of the battery 22. This mechanism of capacity fade can be math-ematically modeled. The resulting model can serve as the basis for battery health management in the vehicle 20.

The stresses in the shell 42 are proportional to a state of lithiation swing of the negative electrode 30. State of lithiation swing during charging or discharging is related to the state of charge swing of the battery 22 during operation. For relatively low charging currents, the stress and fracture tendency in the shell 42 is higher than the fracture tendency of the underlying core 40.

An estimation of the instant capacity loss of the battery 22 can be determined as a function that includes a state-of-lithiation swing on the SEI of the negative electrode 30. For example, in such an estimation it can be assumed that the negative electrode 30 includes a large number of the electrode particles 38. Under the operating conditions of the battery 22 all the freshly exposed surfaces of the graphite form SEI. For example, ethylene carbonate solvent can be reduced in the presence of lithiated carbon per the equation below.

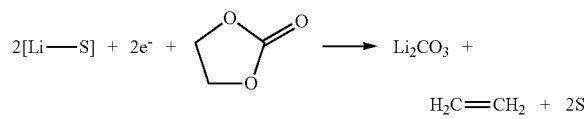

The lithium guest species corresponds to [Li—S] and S is a vacant site within the host carbon. The lithium carbonate product leads to SEI formation, stabilization of the exposed electrode surface, and a loss of active lithium. The SEI may be a complex mixture of many solid phases.

In the following examples, the bulk active phase of the core 40 is referred to as the α phase (alpha phase) and the shell 42, or SEI layer, as SEI. The following definitions of symbols and parameters may be useful in understanding this disclosure:

LIST OF SYMBOLS

| | |
|---|---|
| $r, \theta, \phi$ | spherical coordinates |
| $\Omega_i$ | partial molar volume of the solute in phase 'i' (m³/mol) |
| R | radius of the spherical electrode particle (m) |
| t | thickness of SEI |
| $r_i$ | radial location of interface between active core and SEI form the center of particle (m) |
| $v_i$ | Poisson's ratio of phase 'i' |
| $E_i$ | Young's modulus of phase 'i' (N/m²) |
| u | radial displacement (m) |
| $\sigma_r$ | radial stress (N/m²) |
| $\sigma_\theta$ | tangential stress (N/m²) |
| $\sigma_{shear}$ | shear stress (N/m²) |
| $\epsilon_{rr}$ | radial strain |
| $\epsilon_{\theta\theta}$ | tangential strain |
| C(r, t) | solute concentration at radius r at time t (mol/m³) |
| $C_{max}^\alpha$ | saturation concentration of solute in active core (mol/m³) |
| $C_0^\alpha$ | initial concentration of solute in active core phase (mol/m³) |
| $D_\alpha$ | diffusion coefficient of the solute in α phase (m²/sec) |
| I | current density on the electrode particle (A/m²) |
| F | Faraday constant (C) |
| T | time |
| x | dimensionless radius |
| $x_i$ | dimensionless radial location of interface |
| $\tau$ | dimensionless time |
| y | dimensionless concentration |
| $\xi_i$ | dimensionless stress in i direction |

-continued

| | |
|---|---|
| $\xi_\theta$ | dimensionless tangential stress |
| $\sigma_f$ | fracture strength of a material |
| $\Delta SOL$ | swing in state of litigation of the negative electrode |
| $e(r)$ | local strain energy density (J/m³) |
| $W_{bulk}$ | total strain energy stored due to bulk deformation (J) |
| $\pi_{total}$ | Normalized total strain energy for a particle with SEI layer |
| $\pi_{cracked\_SEI}$ | Normalized electrode particle strain energy after SEI is cracked |
| $\pi_{excess}$ | Normalized strain energy released after SEI cracking |
| $\gamma$ | surface energy of SEI material |
| $l_{crack}$ | length of crack on SEI |
| $w$ | distance between the cracked SEI surfaces |
| $A_{electrode}^{new}$ | new electrode surface exposed to the electrolyte due to SEI cracking |
| $SOL_n$ | Possible state of lithiation of the negative electrode after n cycles based on the available lithium inventory |
| $\Delta SOL_n$ | swing in state of lithiation on 'n'$^{th}$ cycle |
| $Q_{lossn}$ | Capacity lost in 'n'$^{th}$ cycle |
| a' and a | Proportionality constants |
| $Q_n$ | cell capacity after n cycles |
| $R_{AC}$ | ratio of initial anode capacity to the initial cell capacity |

List of Parameters

| | | |
|---|---|---|
| D | diffusion coefficient of the solute in solid phase (m²sec⁻¹) | 10⁻¹⁴ (m²sec⁻¹) |
| $E_\alpha$ | Young's modulus of the electrode material (Nm⁻²) | 3.3 × 10¹⁰ (Nm⁻²) |
| $E_{SEI}$ | Young's modulus of the Lithium carbonate SEI (Nm⁻²) | 6.6 × 10¹⁰ (Nm⁻²) |
| t | SEI thickness (m) | 50 × 10⁻⁹ m |
| F | Faraday's constant (C) | 96500 C |
| C_rate | Charge discharge rate | 0.5 (hour⁻¹) |
| R | radius of the spherical electrode particle (m) | 5 × 10⁻⁶ (m) |
| $\rho_{graphite}$ | density of graphite (gm m⁻³) | 2.11 × 10⁶ (gm m⁻³) |
| $\Omega_\alpha$ | partial molar volume of the solute (m³mol⁻¹) | 8.9 * 10⁻⁶ (m³mol⁻¹) |
| — | specific capacity of graphite (mAh gm⁻¹) | 339 (mAh gm⁻¹) |
| $C_{max}^\alpha$ | saturation lithium concentration in graphite phase | 25 × 10³ (mol m⁻³) |
| $v_\alpha, v_{SEI}$ | Poisson's ratio of phase 'α' phase and SEI | 0.3 |

Using an analogy between thermal stress and diffusion-induced stress, the stress-strain relationships expressed in a spherical coordinate system for the radial and tangential components are:

$$\varepsilon_r = \frac{1}{E_i}(\sigma_r - 2v_i\sigma_\theta) + \frac{1}{3}\Omega_i(C(r,t) - C_{ini}(r,0)) \quad (1)$$

$$\varepsilon_\theta = \frac{1}{E_i}((1-v_i)\sigma_\theta - v_i\sigma_r) + \frac{1}{3}\Omega_i(C(r,t) - C_{ini}(r,0))$$

where Young's modulus is $E_i$, Poisson's ratio is $v_i$, the partial molar volume of the solute is $\Omega_i$ for the respective α phase and SEI phase, molar concentration is C and the radial and tangential stresses are represented by $\sigma_r$ and $\sigma_\theta$. It is also assumed that the elastic properties of any of the phases do not vary with the lithium composition variation in it.

Due to the spherical symmetry, the radial and tangential strains, in the infinitesimal formulation of deformation, can be expressed as functions of radial displacement, u, as:

$$\varepsilon_{rr} = \frac{du}{dr}, \varepsilon_{\theta\theta} = \frac{u}{r} \quad (2)$$

Since atomic diffusion in solids is a much slower process than elastic deformation, the mechanical equilibrium is established much faster than that of diffusion. The mechanical equilibrium is, therefore, treated as a static equilibrium problem.

In the absence of any body-force, the equation for static mechanical equilibrium in the bulk of a sphere is given by following equation, $$\frac{d\sigma_r}{dr} + \frac{2(\sigma_r - \sigma_\theta)}{r} = 0 \quad (3)$$

Without considering the effects of surface energy and surface stresses, the normal stress at the free surface of the spherical particle is $\sigma_r(R)=0$. Since the normal component of stresses and displacements are continuous at the interface between the α phase and SEI layer, $\sigma_r(r_i^\alpha)=\sigma_r(r_i^{SEI})$ and $u(r_i^\alpha)=u(r_i^{SEI})$.

The solutions of this differential equation for the case with constant E, v and $\Omega$, are given by:

$$\sigma_r(r,t) = -\frac{\Omega E}{3(1-v)}\frac{2}{r^3}\int_a^r (C(r,t)-C_{ini}(r,0))r^2 dr + \left[\frac{EI_1}{(1-2v)} - \frac{E}{(1+v)}\frac{I_2}{r^3}\right]$$

$$\sigma_\theta(r,t) = \frac{\Omega E}{3(1-v)}\frac{1}{r^3}\int_a^r (C(r,t)-C_{ini}(r,0))r^2 dr -$$
$$\frac{\Omega E(C(r,t)-C_{ini}(r,0))}{3(1-v)} + \left[\frac{EI_1}{(1-2v)} + \frac{E}{(1+v)}\frac{I_2}{r^3}\right]$$

and the displacement u(r,t) is given by, $$u(r,t) = \left(\frac{1+v}{1-v}\right)\frac{\Omega}{3r^2}\int_a^r (C(r,t)-C_{ini}(r,0))r^2 dr + rI_1 + \frac{I_2}{r^2} \quad (4)$$

The constants $I_1$ and $I_2$ can be obtained from the appropriate boundary conditions for both the α phase and the SEI layer. Because stress and displacement are finite at r=0, for the α phase within $0 \leq r < r_i$, $$\sigma_r(r,t) = -\frac{2E_\alpha}{3(1-v_\alpha)}\frac{\Omega_\alpha}{3}(C_{avg}^\alpha(r,t) - C_{ini\_avg}(r,0)) + \frac{E_\alpha I_{1\alpha}}{(1-2v_\alpha)} \quad (5a)$$

$$\sigma_\theta(r,t) = \frac{E_\alpha}{3(1-v_\alpha)}\frac{\Omega_\alpha}{3}(C_{avg}^\alpha(r,t) - C_{ini\_avg}(r,0)) -$$
$$\frac{E_\alpha \Omega_\alpha(C(r,t)-C_{ini}(r,0))}{3(1-v_\alpha)} + \frac{E_\alpha I_{1\alpha}}{(1-2v_\alpha)}$$

Here, $C_{avg}^\alpha(r)=(3/r^3)\int_0^r C(r')r'^2 dr'$ is the average concentration in the α phase ($0 \leq r \leq r_i$).

$$I_{1\alpha} = \quad (5b)$$
$$\left(1 - \left(1 - \frac{E_{SEI}(1-v_\alpha)}{E_\alpha(1-v_{SEI})}\right)\frac{(1+v_{SEI})}{(1-v_{SEI}) + \frac{2t}{R}\left(\frac{(1-2v_\alpha)E_{SEI}}{E_\alpha}(1-2v_{SEI})\right)}\right)$$

-continued $$\left.\frac{3t}{R}\right)\frac{2(1-2v_\alpha)}{3(1-v_\alpha)}\frac{\Omega_\alpha}{3}(C^\alpha_{avg}(r_i) - C_{ini\_avg}(r_i))$$

Here, t is the thickness of the SEI layer. It is also assumed that t<<R and thus the higher order terms of (t/R) are neglected.

For the SEI layer in the region of $r_i \le r \le R$, $\Omega_{SEI} = 0$ i.e. there is no expansion in the SEI layer due to ionic conduction:

$$\sigma^{SEI}_r(r, t) = \tag{6}$$

$$\frac{2E_{SEI}}{(1 + v_{SEI})}\left(\frac{1}{R^3} - \frac{1}{r^3}\right)\frac{(1 + v_{SEI})\Omega_\alpha/3(C^\alpha_{avg}(r_i) - C_{ini\_avg}(r_i))}{3(1 - v_{SEI}) + \frac{6t}{R}\left(\frac{(1-2v_\alpha)E_{SEI}}{E_\alpha} - (1 - 2v_{SEI})\right)}$$

$$\sigma^{SEI}_\theta(r, t) = \left[\frac{2}{R^3} + \frac{1}{r^3}\right]\frac{E_{SEI}}{(1 + v_{SEI})}$$

$$\frac{(1 + v_{SEI})\Omega_\alpha/3(C^\alpha_{avg}(r_i) - C_{ini\_avg}(r_i))}{3(1 - v_{SEI}) + \frac{6t}{R}\left(\frac{(1-2v_\alpha)E_{SEI}}{E_\alpha} - (1 - 2v_{SEI})\right)}$$

At any radial position, location, $r = r_1 (>r_i)$, $$\sigma_r(r_1), \sigma_\theta(r_1) \propto (C^\alpha_{avg}(r_i) - c_{ini\_avg}(r_i)) \tag{7}$$

Change in State of lithiation $$(\Delta SOL) = \frac{(C^\alpha_{avg}(r_i) - C_{ini\_avg}(r_i))}{C^\alpha_{max}} \tag{8}$$

hence $\sigma_r(r_1), \sigma_\theta(r_1) \propto \Delta SOL$ (9)

Here $C_{max}^\alpha$ is the solute concentration when the active material is fully lithiated.

The term "state of charge swing" (ΔSOC) can be loosely used to indicate "change in state of lithiation (SOL)" of the negative electrode 30. In a full cell configuration, the "state of lithiation" of the negative electrode 30 is related to the state of charge of the cell and the capacity ratio of the positive electrode 28 to the negative electrode 30. State of lithiation of the negative electrode 30 in an aged cell would be less than that of a new cell even if the cell is charged to the same voltage limit.

Also assuming that constant current charging and discharging is equivalent to constant surface flux condition at the active material interface, the SEI acts as an ionic conductor and all the current carries through the SEI is due to migration of ions.

Fickian diffusion of a solute in active α-phase core, $0 \le r < r_i$ $$\frac{\partial C^\alpha(r, t)}{\partial T} = \frac{\mathcal{D}_\alpha}{r^2}\left(\frac{\partial}{\partial r}\left(r^2 \frac{\partial C^\alpha(r, t)}{\partial r}\right)\right) \tag{10}$$

where $C^\alpha(r,t)$ is the concentration of solute at a time t at a radial position r.

At the interface ($r = r_i$) between the shell and the core, the flux is constant $$\mathcal{D}_\alpha \frac{\partial C^\alpha}{\partial r}\bigg|_{r_i} = \frac{I}{F} \tag{10a}$$

where I is current density on the surface of the electrode, F is the Faraday Constant For lithiation, it is assumed, initially, T=0, and both phases are equilibrated $$C^\alpha(r, 0) = C_{ini}(r, 0) \tag{10b}$$

The solution is well behaved at the center of the particle r=0

$$\frac{\partial C^\alpha(r, 0)}{\partial r} = 0 \tag{10c}$$

Such an equation system is solved by $$C^\alpha(r, 0) = \tag{10d}$$

$$C_{ini}(r, 0) + \frac{IR}{F\mathcal{D}_\alpha}\left\{3\tau - \frac{1}{2}x^2 - \frac{3}{10} - \frac{2}{x}\sum_{n=1}^\infty \frac{\sin(\lambda_n x)}{\lambda_n^2 \sin(\lambda_n)} e^{-\lambda_n^2 \tau}\right\}$$

where $$\tau = \frac{T\mathcal{D}_\alpha}{R^2}, x = \frac{r}{R},$$

and $\lambda_n$ (n=1, 2, 3, . . . ) is a solution of $\tan(\lambda_n) = \lambda_n$.

Analysis of Stresses

Combining equation set 5 and 6 with equation 10, stresses can be estimated in a core-shell configuration of an electrode particle where active electrode particle core is encapsulated by a SEI layer shell. The SEI is assumed to be ionic conductor and there is no concentration gradient in the SEI layer. It is also assumed the electrode particle is made up of 10 micron diameter spherical graphite particle, that the SEI thickness is 1% of the particle radius (t/R=0.01), and that the SEI includes lithium carbonate ($Li_2CO_3$) as its major element and is 50 nm thick. Stresses are transformed to dimensionless form as follows $$\xi_i = \frac{\sigma_i}{\frac{\Omega\alpha E_\alpha}{3(1 - v_\alpha)}C^\alpha_{max}} \tag{11}$$

Here, 'i' represents direction r, θ, or φ.

Figure 5:
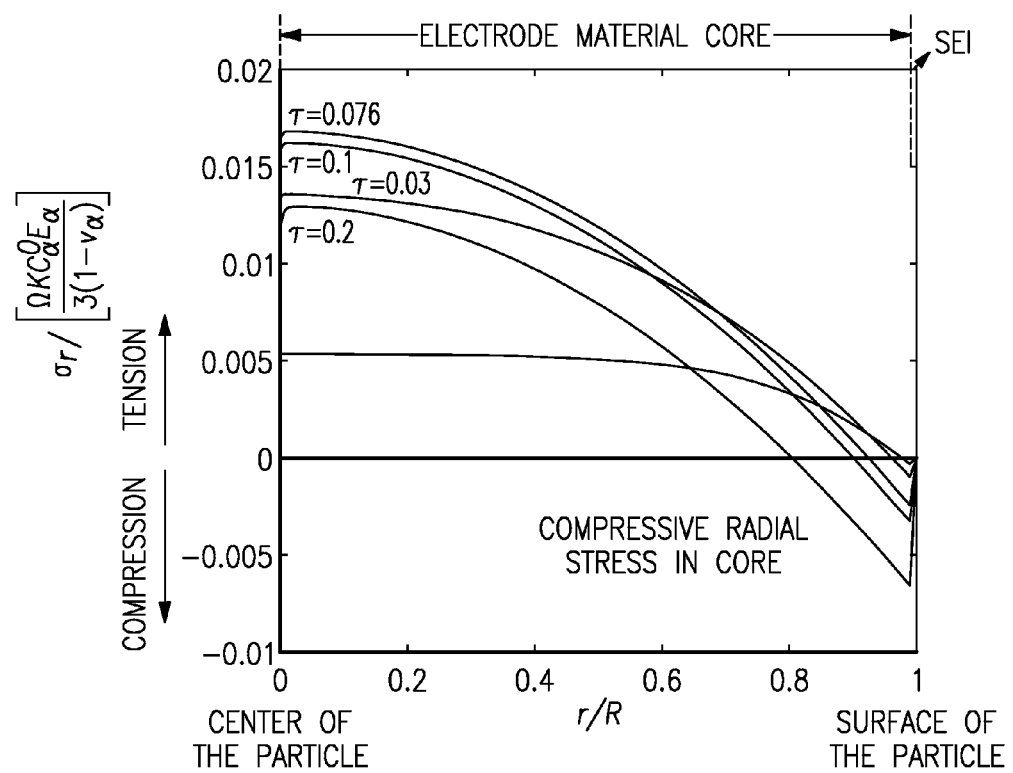
FIG. 5 is a plot of radial stress in an electrode particle.

FIG. 5 shows the radial stress distribution in the active material in the presence of the SEI surrounding the electrode particle. During lithiation SEI exerts a compressive force on the electrode particle core which leads to lower maximum tensile stress at the center of the particle as compared to the radial stress without consideration of SEI. Also, the surface of the active material particle is under compression during lithiation in the radial direction. Similarly there is a compressive stress on the SEI layer in the radial direction which fades gradually from the interface to the outer surface of SEI layer. Surface of SEI layer is free of any radial stress. The maximum radial tensile stress is reached during insertion at the center of the particle and the magnitude of the maximum stress depends on the mechanical properties of SEI such as modulus of elasticity and thickness as indicated by equation 5. The final state of stress in the electrode particle is compressed state since the SEI layer constrains the expansion of the core. Such a constrained electrode particle results in strain energy stored in the particle. The stored strain energy may transform to surface energy by fracture; hence, strain energy can drive crack propagation.

Figure 6:
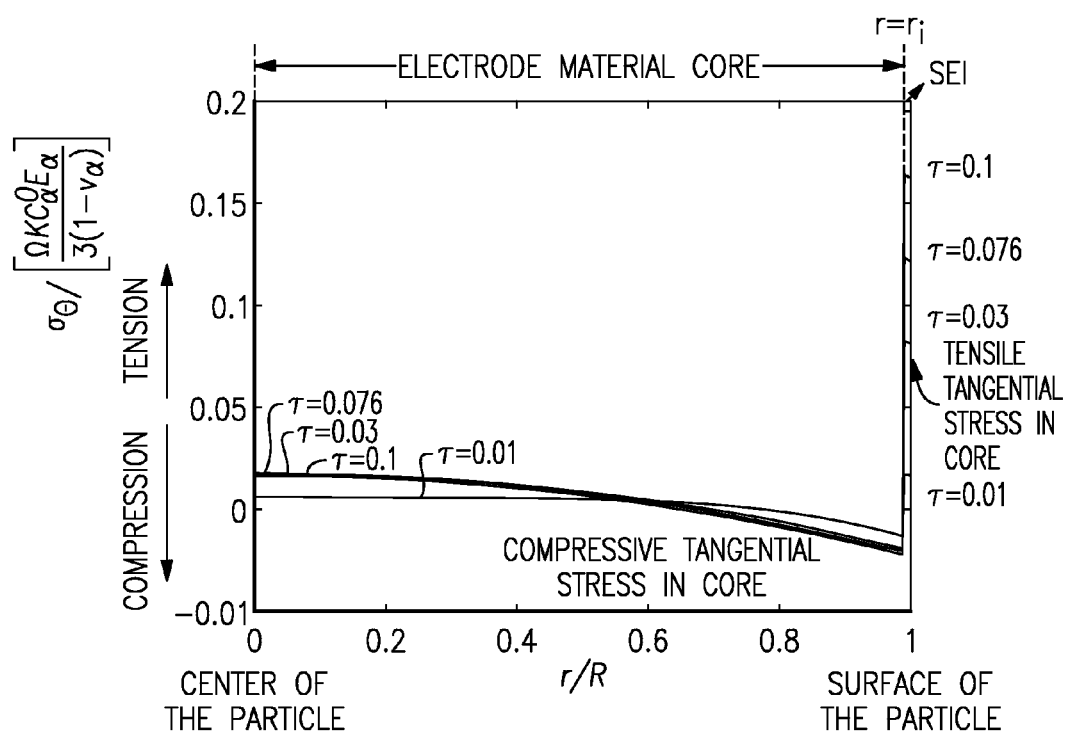
FIG. 6 is a plot of tangential stress in an electrode particle.

In FIG. 6, the tangential stress is shown as a function of radial location and time during lithiation. There is a sharp jump in the tangential stress at the interface of the SEI and the active electrode particle. With lithiation, the SEI layer is subjected to a large tensile stress even though there is a compressive stress in the tangential direction at the surface of active particle. From equation set (6), the radial and tangential stresses in SEI are dependent on the SOL swing or SOC swing during lithiation and are independent of the rate of lithiation.

Figure 7:
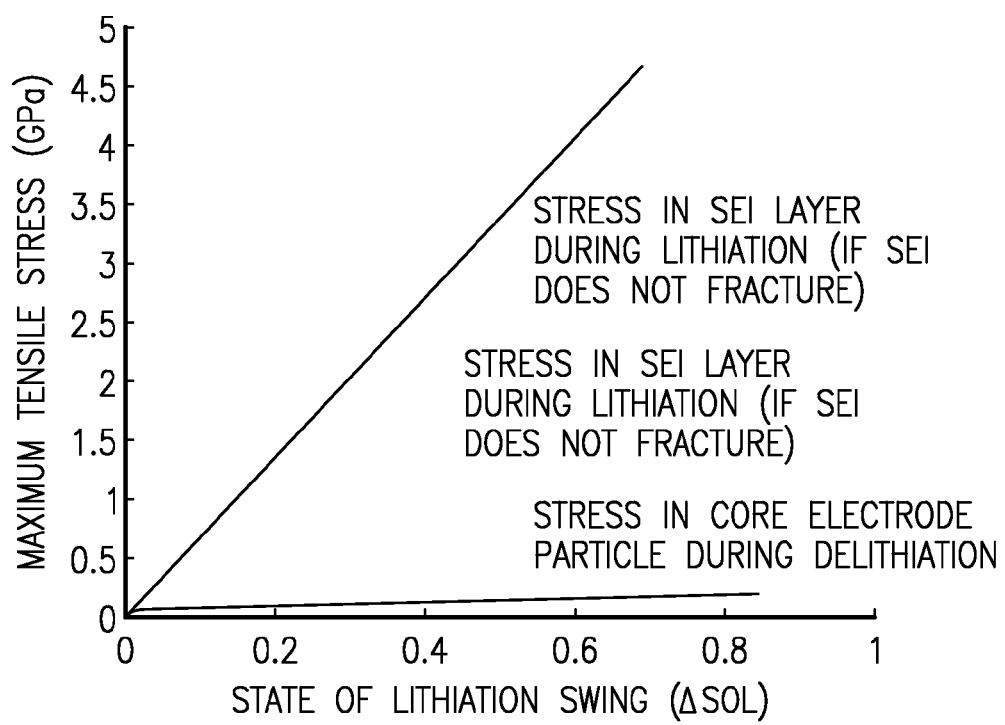
FIG. 7 is a plot of tensile stress in a solid-electrolyte interphase shell and graphite core.

FIG. 7 presents the relation of tangential stresses in SEI as a function of $\Delta$SOL which again confirms that maximum tensile stress in SEI is proportional to the state of charge swing of the battery 22. As shown, the stresses in SEI can go as high as few GPa in large SOL swing. According to Hasselman's criteria, cracking initiates when $\sigma > \sigma_f$, where $\sigma$ is the stress level which the material is subjected to and $\sigma_f$ is the fracture strength of the material. Assuming lithium carbonate SEI layer would have similar properties as other oxide materials, after a certain SOL swing, the fracture tendency (ratio of maximum stress to the tensile strength of the material) of the SEI shell is high. Thus, the SEI cracks during lithiation, thereby exposing a new surface to the electrolyte leading to capacity fade. Porosity of the SEI may affect the modulus of elasticity of the SEI and fracture toughness of SEI in the same direction and thus the results would be qualitatively the same.

FIG. 7 also shows a plot of the maximum tensile stress experienced by the active material particle as a function of $\Delta$SOL at a discharging rate of 0.5 C. With the current assumption of electrode material properties, at low rate the stress experienced by the electrode particle is lower than that in the SEI shell. Given the high theoretical fracture strength of graphite material (approximately 3 GPa), fracture tendency of the electrode material is low at slow cycling conditions.

Strain Energy Calculations for SEI Cracking

The bulk strain energy per unit volume, or the bulk strain energy density, $e(r)$, accumulated as a result of the elastic deformation for the isotropically deformed sphere is:

$$e(r) = \frac{1}{2E}(\sigma_r^2 + 2\sigma_\theta^2) - \frac{v}{E}(2\sigma_r\sigma_\theta + \sigma_\theta^2). \tag{12}$$

The total strain energy can be obtained by integrating the strain energy density over the entire volume. In a core-shell model, the total energy is the sum of strain energies in both the phases. The total strain energy of such an electrode particle in dimensionless form is $$\prod_{total} = \frac{W_{bulk}}{2\pi R^3 E_a \left(\frac{\Omega \alpha C_{max}^a}{3(1-v_a)}\right)^2} \tag{13}$$

$$= \int_0^{(r_i/R)} [(\xi_r^2 + 2\xi_\theta^2) - 2v_a\xi_\theta(2\xi_r + \xi_\theta)]x^2 dx +$$

$$\int_{(r_i/R)}^1 \frac{E_a}{E_{SEI}} [(\xi_r^2 + 2\xi_\theta^2) - 2v_{SEI}\xi_\theta(2\xi_r + \xi_\theta)]x^2 dx$$

If the SEI cracks, only a part of this total strain energy will be released. Cracking of SEI will result in only a partial stress release in the core region. In other words, if the SEI cracks, the active particle core will still be in stressed state due to the concentration gradients of the solute present. When SEI cracks, the stresses developed in the core as an effect of SEI confinement will be released along with the stresses developed in the SEI region. Hence the final stress state of particle just after cracking of SEI will be same as if there was no SEI present. The stain energy released due to SEI cracking would be the difference of total strain energy and the strain energy in the particle after SEI cracks. The excess strain energy ($\Pi_{excess}$) is the difference of strain energy with SEI and strain energy of a particle after SEI cracks. The strain energy of the particle with a cracked SEI ($\Pi_{cracked\_SEI}$) can be calculated with the assumption that no SEI present, i.e., by assuming thickness t=0 in equation set 5.

$$\Pi_{excess} = \Pi_{total} - \Pi_{cracked\_SEI} \tag{14}$$

Once the SEI cracks, partial stresses in SEI layer are relieved. Though, there is finite strain energy ($\Pi_{cracked\_SEI}$) in the particle after SEI cracking, low magnitude of stresses in SEI layer avoids further cracking of SEI.

Figure 8:
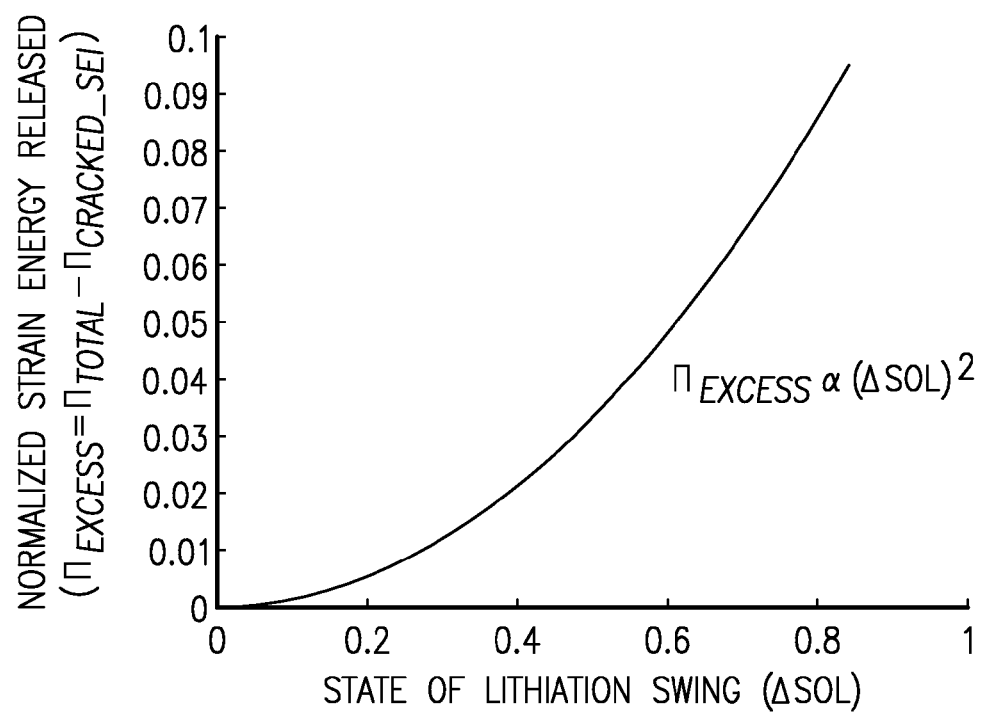
FIG. 8 is a plot of normalized strain energy in an electrode particle as a function of state of lithiation.

FIG. 8 shows the excess strain energy as a function of SOL swing. At low rate charge rate, such as 0.5C, the strain energy released is proportional to the square of SOL swing ($\Delta$SOL)$^2$ of the electrode particle.

$$\Pi_{excess} \propto (\Delta SOL)^2 \tag{15}$$

The strain energy released is utilized for new surface formation.

$$\Pi_{excess} = 2\gamma(\text{Area of cracked SEI surface}) = 2\gamma \times t \times l_{crack} \tag{16}$$

where A is the new area created, t is the thickness of SEI and $l_{crack}$ is the length of crack in SEI.

It is assumed that the SEI thickness t does not change significantly once initial SEI is formed, the length of crack is proportional to the energy released.

$$l_{crack} \propto \Pi_{excess} \text{ i.e. } l_{crack} \propto (\Delta SOL)^2 \tag{17}$$

Figure 4:
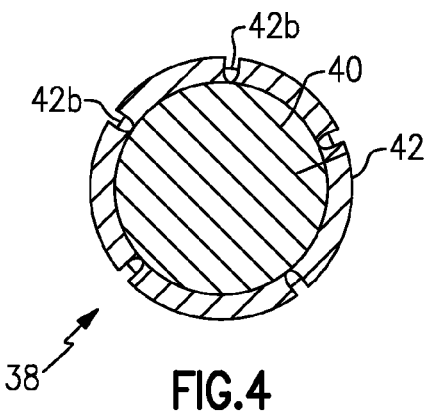
FIG. 4 illustrates the electrode particle of FIG. 2 with fractures in the solid-electrolyte interphase shell.

Cracked SEI exposes new electrode particle 38 surface to the electrolyte and new SEI is formed in the exposed area (see FIG. 4). If the width between two cracked surfaces of SEI is approximately constant, the new surface of the electrode particle exposed to the electrolyte is proportional to the length of crack. Under the operating conditions in an SEI formed on this surface newly exposed surface results in capacity loss of the battery ($Q_{loss}$).

Electrode area exposed to the electrolyte on SEI cracking=$A_{electrode}^{new} = l_{crack} \times w$ (18)

If the distance between the cracked surfaced of SEI is approximately constant, i.e., width 'w' is constant $$A_{electrode}^{new} \propto l_{crack}$$

$$\Rightarrow A_{electrode}^{new} \propto (\Delta SOL)^2$$

$$\Rightarrow Q_{loss} \propto (\Delta SOL)^2$$

$$\Rightarrow Q_{loss} = a'(\Delta SOL)^2 \tag{19}$$

Where a' (<1) is a constant which includes rate of reaction (thus temperature), number of lithium molecules related to rate of reaction, and initial ratio of cell capacity to anode capacity, the mechanical properties of SEI material.

Cycle Life Predictions

If a battery is continuously cycled between two voltage limits, capacity of the battery fades over life. Capacity fade also implies that there is less lithium available to lithiate the negative electrode 30 on charging of the battery. Hence, the battery cycles between two voltages limits, and the state of lithiation of a graphite particle at the higher voltage limits decreases. The $SOL_n$ is defined as a possible state of lithiation of the negative electrode 30 based on the available active lithium inventory after "n" cycles. Less lithiation of graphite leads to less expansion of the electrode particles 38 over cycling. If $R_{AC}$ is the initial ratio of anode capacity to initial cell capacity ($Q_0$) between given voltage limits, the initial state of lithiation ($SOL_0$) can be written as $$SOL_0 = Q_0 * R_{AC} \quad (20)$$

i.e., $Q_0 = \dfrac{SOL_0}{R_{AC}}$ $$SOL_0 = SOL_{min} + \Delta SOL_0 \quad (21)$$

$$\Delta SOL_0 = SOL_0 - SOL_{min} \quad (22)$$

where, $SOL_{min}$ is the lithiation state of the electrode at the end charge of first cycle. Since there is no loss of electrode material during slow cycling, state of lithiation at the end of lithiation would remain constant $SOL_{n\_min} = SOL_{min}$.

The state of lithiation ($SOL_0$) of the negative electrode 30 is when the cell 24 is charged to upper voltage limit before any capacity fade. The possible state of lithiation of the negative electrode after "n" cycles is ($SOL_n$)

A mathematical formulation of capacity loss can be estimated for a full cell continuously cycled between two voltage limits;

Capacity loss on $1^{st}$ cycle (after formation)

$$Q_1 = Q_0 - Q_{loss1} \quad (23)$$

$$SOL_1 = SOL_0 - a(\Delta SOL_0^2) = SOL_{min} + \Delta SOL_0 - a(\Delta SOL_0)^2$$

$$SOL_1 = SOL_{min} + (1 - a\Delta SOL_0)\Delta SOL_0 \quad (24)$$

$$\Delta SOL_1 = (1 - a\Delta SOL_0)\Delta SOL_0 \quad (24a)$$

here $Q_{loss1}$ is the capacity lost in the $1^{st}$ cycle, $SOL_1$ is the state of lithiation of the negative electrode 30 after $1^{st}$ cycle Similarly, the state of lithiation after second cycle, $$SOL_2 = SOL_1 - a(\Delta SOL_1)^2 = SOL_{min} + \Delta SOL_1 - a(\Delta SOL_1)^2 \quad (25)$$

$$\Delta SOL_2 = (1 - a\Delta SOL_1)\Delta SOL_1 = (1 - a((1 - a\Delta SOL_0)\Delta SOL_0))(1 - a\Delta SOL_0)\Delta SOL_0 = \Delta SOL_0 - 2a(\Delta SOL_0)^2 + 2a^2(\Delta SOL_0)^3 - a^3(\Delta SOL_0)^4 \quad (26)$$

Since $\Delta SOL_0 < 1$ and $a < 1$ the higher order 0 ($a\Delta SOL_0$) >7 can be neglected.

A generalized equation for state of lithiation after $n^{th}$ cycle ($n \geq 3$) can be represented as $$\Delta SOL_n = \Delta SOL_0 - (n-1)a(\Delta SOL_0)^2 + (n-1)(n-2)a^2(\Delta SOL_0)^3 - \Sigma_{i=3}^{n}(i-2)(3i-8)a^3(\Delta SOL_0)^4 \quad (27)$$

$$Q_n = R_{AC} \times SOL_n = R_{AC} \times (SOL_{min} + \Delta SOL_n) = R_{AC} \times (SOL_{min} + \Delta SOL_0 - (n-1)a(\Delta SOL_0)^2 + (n-1)(n-2)a^2(\Delta SOL_0)^3 - \Sigma_{i=3}^{n}(i-2)(3i-8)a^3(\Delta SOL_0)^4) \quad (28)$$

where $Q_n$ is the cell capacity after n cycles with additional calendar aging.

If discharging the battery completely to minimum recommended battery voltage (e.g., 2.0V), then $SOL_{min} = 0$, hence capacity after n cycles is $$Q_n = R_{AC} \times (\Delta SOL_0 - (n-1)a(\Delta SOL_0)^2 + (n-1)(n-2)a^2(\Delta SOL_0)^3 - \Sigma_{i=3}^{n}(i-2)(3i-8)a^3(\Delta SOL_0)^4) \quad (29)$$

Thus battery capacity on cycling can be described with "state of lithiation swing" of the negative electrode 30 and only one constant, "a." Further, capacity fade is also a function of initial ratio of theoretical anode capacity to the cell capacity (at 100% SOC), i.e., $R_{AC}$. The value of "a" is a function on the material properties of SEI layer, material properties of electrode, rate of lithiation, i.e., applied current density, radius of particles, diffusion coefficient of the electrodes, temperature of operation, etc. At high charge discharge rate or at low operating temperatures other mechanisms such as electrode particle cracking, binder degradation might have additional effect to the described mechanism of degradation.

EXAMPLE

Figure 9:
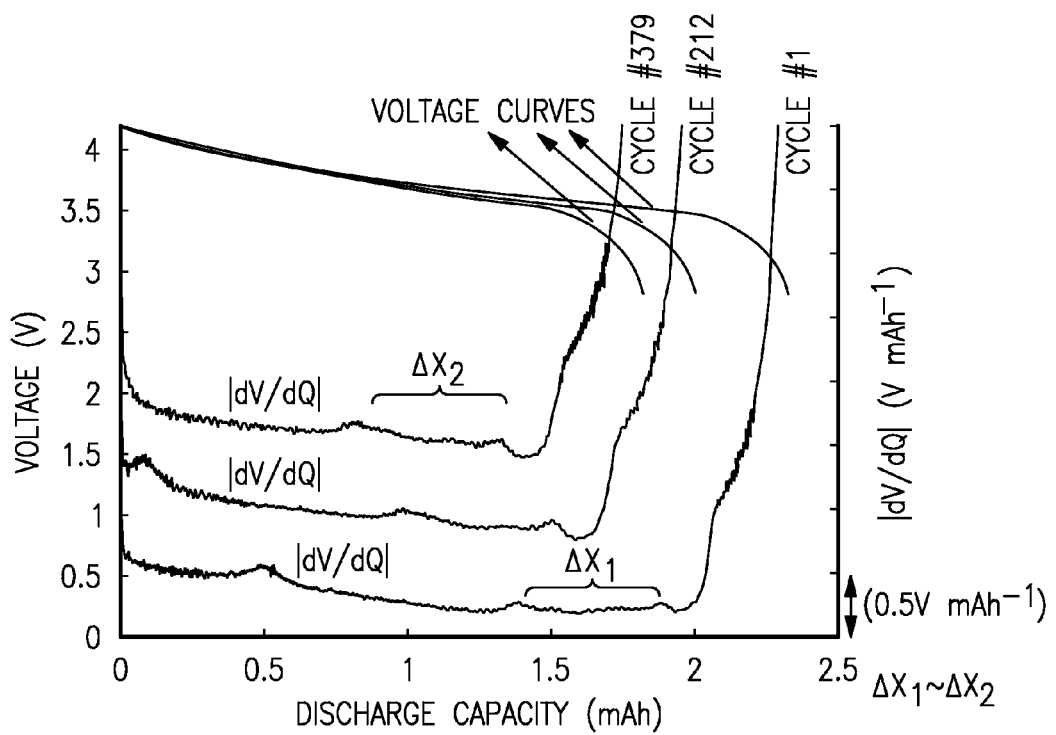
FIG. 9 is a plot of voltage as a function of discharge capacity after different numbers of charge/discharge cycles of a cell.

Cells were cycled at C/2 charge discharge rate with voltage limits of 4.2V-2.0V. The theoretical capacity ratio of anode to the cell in this voltage range $R_{AC}$ is 1.45. A cycling rate of C/2 was chosen as it is relatively low cycling rate and any degradation due to particle cracking and material loss can be minimized. After every 40 cycles at C/2 rate, couple of C/10 cycles within the same voltage limits were used to measure the cell capacity avoiding the effects of impedance rise over cycling. FIG. 9 shows the voltage profile of the cell at different stages over cycling. The voltage of a cell cycled 379 cycles has much lower discharge capacity as compared to a new cell on its first cycle within a given voltage limits. From the voltage curves, there is a capacity loss over cycling. To confirm that there is no material degradation, differential voltage is plotted against the cell capacity (dV/dQ vs Q) for different cycle number. In the differential voltage curves there is no change in the distance between peaks over cycling, i.e., $\Delta x_1 \approx \Delta x_2$. The distance between peaks of a differential voltage curve in graphite NMC cell chemistry indicates the amount of negative electrode material available for lithium storage. If the distance between these peaks decreases over cycling, it implies that there is loss of graphite electrode material from the composite electrode. In the given example system, there is thus no loss of electrode material over cycling.

Figure 10:
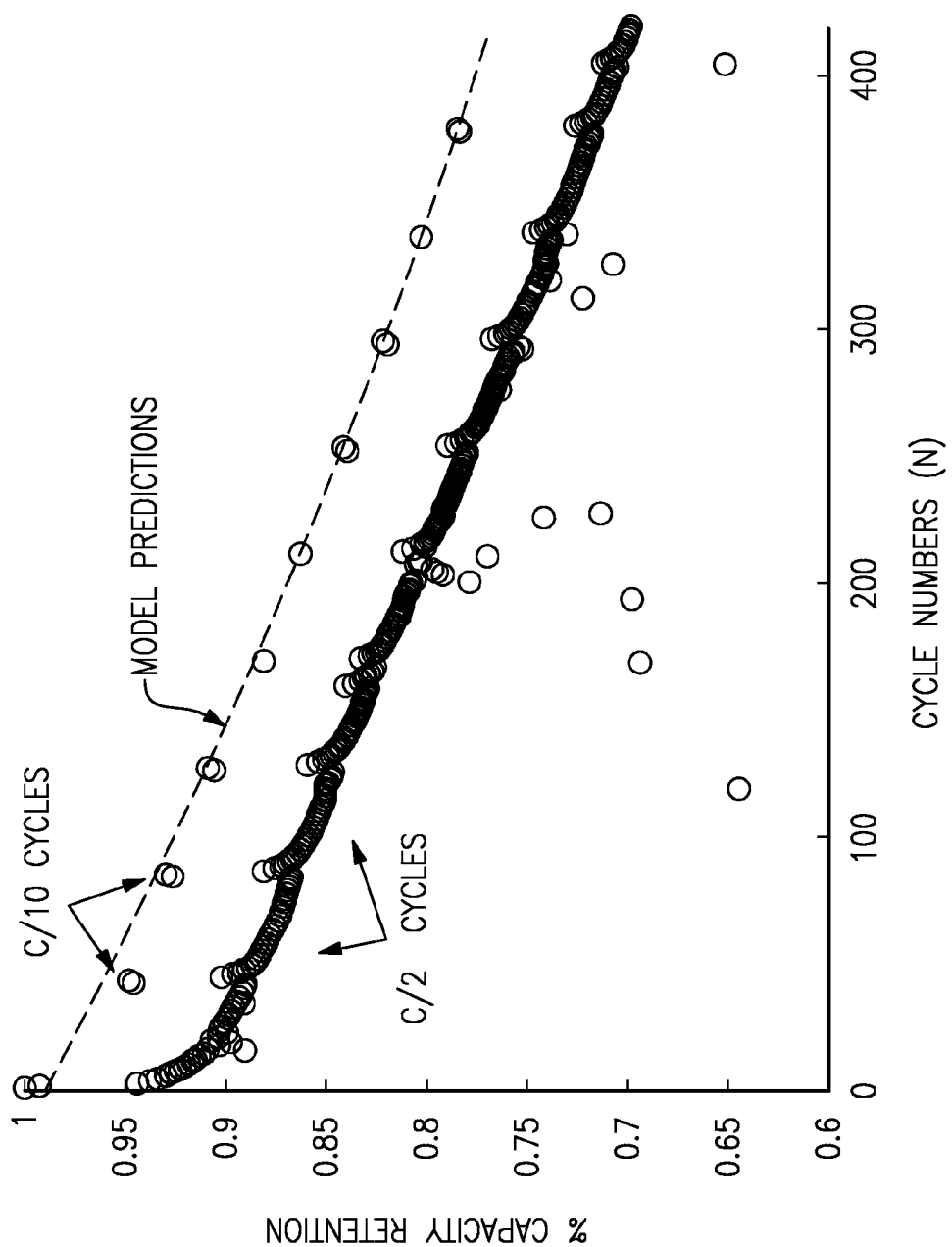
FIG. 10 is a plot of model cell capacity and experimental capacity as a function of number of charge/discharge cycles.

FIG. 10 shows a plot of the capacity of the cell over cycling. After every 40 cycles at C/2 cycling rate, 2 slow cycles (at C/10 rate) were performed to measure the real capacity of the cell independent of the impedance rise. The circles showing higher capacity represent the capacity of the cells at C/10 cycles. Comparing the experimental results with the model (equation 29) predictions (represented by purple dashed line), the model predictions match very closely to the experimental results with parameter constant of a=0.001. Thus, only a single parameter, "a," was needed to fit the experimental data. This suggests that the model accurately predicts the capacity retention of a cell.

The example methods herein for the estimation of battery capacity after a number of charging/discharging cycles can be used to enhance controls that are related to battery health and remaining instantaneous battery life. The disclosed methods provide an estimation of capacity as a function that includes a state-of-lithiation swing with respect to a solid-electrolyte interphase of an electrode of the lithium-ion battery module. The estimation is relatively simple in comparison to other models that rely mostly on experimental data. For example, the estimation can be made based on limited information, including the ratio of the negative electrode capacity to the cell capacity in a given voltage range, data from only a few tens of slow charge/discharge cycles for a given battery chemistry in a known voltage range, and the state of charge swing during battery charge in operation. This information can be obtained from the battery supplier, measured with a reference electrode, and obtained using "am-hour" integration of charging current during usage with vehicle on-board data or test data. Thus, once in a vehicle, the methodology herein can provide estimations of capacity using only on-board information, without the need for external data input or additional external data collection.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method comprising:
controlling operation of a vehicle in response to an estimation of a capacity loss and a capacity of a lithium-ion battery module of the vehicle as a function that includes a state-of-lithiation swing and fracture of solid-electrolyte interphase of an electrode of the lithium-ion battery module, the capacity is represented by $Q_n$, and the function is:

$$Q_n = R_{AC} \times \left( \Delta SOL_0 - (n-1)a(\Delta SOL_0)^2 + (n-1)(n-2)a^2(\Delta SOL_0)^3 - \sum_{i=3}^{n}(i-2)(3i-8)a^3(\Delta SOL_0)^4 \right)$$

wherein,
$R_{AC}$ is an initial ratio of anode electrode capacity of the lithium-ion battery module to initial cell capacity in a given voltage range,
$\Delta SOL_0$ is an initial state of lithiation,
n is a number of charge-discharge cycles,
a is a constant of the lithium-ion battery module, and
i is a polynomial order derivative.

2. The method as recited in claim 1, further comprising storing the capacity in a memory module of the vehicle in place of a prior capacity of the lithium-ion battery module.

3. The method as recited in claim 1, wherein the electrode is a negative electrode of the lithium-ion battery module.

4. The method as recited in claim 1, wherein the electrode includes a graphite core surrounded by a shell of the solid-electrolyte interphase.

5. A vehicle comprising:
a lithium-ion battery module; and
a controller controlling operation of the vehicle in response to estimation of a capacity loss and a capacity of the lithium-ion battery module as a function that includes a state-of-lithiation swing and fracture of a solid-electrolyte interphase of an electrode of the lithium-ion battery module, the capacity is represented by $Q_n$, and the function is:

$$Q_n = R_{AC} \times \left( \Delta SOL_0 - (n-1)a(\Delta SOL_0)^2 + (n-1)(n-2)a^2(\Delta SOL_0)^3 - \sum_{i=3}^{n}(i-2)(3i-8)a^3(\Delta SOL_0)^4 \right)$$

wherein,
$R_{AC}$ is an initial ratio of anode electrode capacity of the lithium-ion battery module to initial cell capacity in a given voltage range,
$\Delta SOL_0$ is an initial state of lithiation,
n is a number of charge-discharge cycles,
a is a constant of the lithium-ion battery module, and
i is a polynomial order derivative.

6. The vehicle as recited in claim 5, further comprising a memory module configured for storing the capacity in place of a prior capacity of the lithium-ion battery module.

7. The vehicle as recited in claim 5, wherein the electrode is a negative electrode of the lithium-ion battery module.

8. The vehicle as recited in claim 5, wherein the electrode includes a graphite core surrounded by a shell of the solid-electrolyte interphase.

9. A method comprising:
estimating an instant capacity of a lithium-ion battery module of a vehicle as a function that includes a state-of-lithiation swing and fracture of solid-electrolyte interphase of an electrode of the lithium-ion battery module;
storing the instant capacity in a memory storage module of the vehicle; and
controlling operation of the vehicle in response to the instant capacity stored in the memory storage module, wherein the capacity is represented by $Q_n$, and the function is:

$$Q_n = R_{AC} \times \left( \Delta SOL_0 - (n-1)a(\Delta SOL_0)^2 + (n-1)(n-2)a^2(\Delta SOL_0)^3 - \sum_{i=3}^{n}(i-2)(3i-8)a^3(\Delta SOL_0)^4 \right)$$

wherein,
$R_{AC}$ is an initial ratio of anode electric capacity of the lithium-ion battery module to initial cell capacity in a given voltage range,
$\Delta SOL_0$ is an initial state lithiation,
n is a number of charge-discharge cycles,
a is a constant of the lithium-ion battery module, and
i is a polynomial order derivative.

10. The method as recited in claim 1, wherein the controlling of the operation of the vehicle includes controlling a vehicle event that draws current from the lithium-ion battery module.

11. The method as recited in claim 1, wherein the controlling of the operation of the vehicle includes displaying information based upon the capacity and the capacity loss.

12. The method as recited in claim 11, wherein the information is a battery health indication.

13. The vehicle as recited in claim 5, wherein the controlling of the operation of the vehicle includes controlling a vehicle event that draws current from the lithium-ion battery module.

14. The vehicle as recited in claim 5, wherein the controlling of the operation of the vehicle includes displaying information based upon the capacity and the capacity loss.

15. The vehicle as recited in claim 14, wherein the information is a battery health indication.

\* \* \* \* \*